(12) United States Patent
Kaneiwa et al.

(10) Patent No.: US 7,475,612 B2
(45) Date of Patent: Jan. 13, 2009

(54) RESIN GEAR FOR ELECTRIC POWER STEERING APPARATUS AND ELECTRIC POWER STEERING APPARATUS EQUIPPED WITH THE SAME

(75) Inventors: Toshihiko Kaneiwa, Kounan (JP);
Masamitsu Ohtsubo, Inuyama (JP);
Takanori Kurokawa, Kashiwara (JP);
Hirokazu Arai, Yamatokooriyama (JP)

(73) Assignees: Asahi Organic Chemicals Industry Co., Ltd., Nobeoka-Shi (JP); JTEKT Corporation, Osaka-Shi (JP)

( * ) Notice: Subject to any disclaimer, the term of this patent is extended or adjusted under 35 U.S.C. 154(b) by 0 days.

(21) Appl. No.: 11/934,903

(22) Filed: Nov. 5, 2007

(65) Prior Publication Data

US 2008/0066993 A1   Mar. 20, 2008

Related U.S. Application Data

(63) Continuation of application No. PCT/JP2006/310427, filed on May 25, 2006.

(30) Foreign Application Priority Data

May 25, 2005   (JP) .............................. 2005-152203

(51) Int. Cl.
*F16H 55/14* (2006.01)

(52) U.S. Cl. ..................... 74/443; 74/DIG. 10; 180/444

(58) Field of Classification Search ................. 180/444, 180/443; 74/443, DIG. 10
See application file for complete search history.

(56) References Cited

U.S. PATENT DOCUMENTS

| 6,040,050 | A | 3/2000 | Kitigawa et al. |
| 6,557,663 | B2 * | 5/2003 | Kurokawa et al. .......... 180/443 |
| 6,668,535 | B2 * | 12/2003 | Tanahashi et al. ............. 57/289 |
| 6,889,494 | B2 * | 5/2005 | Tanahashi et al. ............. 57/246 |

FOREIGN PATENT DOCUMENTS

| JP |     | 11-117126 |   | 4/1999 |
| JP |     | 2002-039329 |   | 2/2002 |
| JP |     | 2002-070323 |   | 3/2002 |
| JP |     | 2006077809 A | * | 3/2006 |

* cited by examiner

*Primary Examiner*—Kevin Hurley
(74) *Attorney, Agent, or Firm*—Burr & Brown

(57) ABSTRACT

A resin gear for an electric power steering apparatus is provided which offers excellent mechanical strength and durability, and in which damage of teeth, does not occur even when the gear is employed in an electric power steering apparatus equipped with a high-power electric actuator. The resin gear for an electric power steering apparatus includes a worm wheel, and a gear portion thereof is formed of a resin molding material containing a thermosetting resin and polyparaphenylene-benzobisoxazole fibers (PBO fibers) as essential constituents.

7 Claims, 3 Drawing Sheets

RESIN GEAR FOR ELECTRIC POWER STEERING APPARATUS AND ELECTRIC POWER STEERING APPARATUS EQUIPPED WITH THE SAME

This application is a continuation of the International Application No. PCT/JP2006/310427, filed May 25, 2006, which claims the benefit under 35 U.S.C. §119(a)-(d) of Japanese Application 2005-152203, filed May 25, 2005, the entireties of which are incorporated herein by reference.

TECHNICAL FIELD

The present invention relates to a resin gear for an electric power steering apparatus and an electric power steering apparatus equipped with the same, and particularly to a resin gear for an electric power steering apparatus which can be suitably employed in an electric power steering apparatus equipped with a high-power electric actuator for generating steering assist force.

BACKGROUND ART

In recent years, a power steering apparatus having a mechanism for providing assist force to steer the steering wheel has been widely employed in an automobile for the purpose of providing comfortable operability to a driver. In particular, in a light car or a compact car, there has been employed electric power steering in which rotation of an electric actuator for generating steering assist force is transmitted to wheels after the rotation is reduced through a predetermined gear and the like. Here, in such an electric power steering apparatus, one known as a resin gear, having a structure in which a synthetic resin gear portion is mounted on an outer peripheral surface of a metal sleeve or the like as a hub portion, has been generally employed (particularly as a driven gear) for transmitting the rotation of the electric actuator to the wheel. Employment of such a resin gear can reduce the weight and noise of the electric power steering apparatus, and also advantageously realizes low-fuel consumption of the light car or the like.

On the other hand, in a large car whose weight reaches as high as about 2 tons, a hydraulic power steering apparatus using engine power has been generally employed as a steering assist force. However, from the viewpoint of environmental problems, it has recently been demanded to reduce fuel consumption of vehicles. Accordingly, also in such a large car, it has been desired to employ an electric power steering apparatus largely contributable to reduction of fuel consumption thereof.

However, when the electric power steering apparatus is mounted on the large car, an electric actuator having a higher power than the light car or the compact car is required as the electric actuator thereof. However, a conventional resin gear has not had strength or durability sufficient to resist a high-power electric actuator.

Hence, there have been conducted studies and developments of such a resin gear for an electric power steering device having excellent mechanical strength and durability which can be advantageously used also in the electric power steering device equipped with the high-power electric actuator. For example, one of the inventors of this application has previously proposed a resin gear (worm wheel) formed with a thermosetting synthetic resin filled with an aramid resin and an electric steering device equipped therewith, in patent document 1 (U.S. Pat. No. 6, 557,663).

However, although some degree of improvement in mechanical strength, durability and the like is observed in the resin gear (worm wheel) proposed in the patent document 1, it has not been sufficient yet. Therefore, in the present circumstance, it has been strongly desired to develop a resin gear for an electric power steering apparatus which can exhibit more excellent mechanical strength and durability.

Patent Document 1: U.S. Pat. No. 6, 557,663

SUMMARY OF THE INVENTION

The present invention was made in the light of the above-described situation. It is therefore an object of the present invention to provide a resin gear for an electric power steering apparatus excellent in mechanical strength and durability, whose tooth does not chip, for example, even when it is employed in an electric power steering apparatus equipped with a high-power electric actuator. In addition, it is another object of the present invention to provide an electric power steering apparatus equipped with such a resin gear.

Then, in order to solve such problems, the present inventors conducted intensive studies and found that a resin gear in which a gear portion is formed of a resin molding material containing a thermosetting resin and polyparaphenylene-benzobisoxazole fibers as essential constituents has excellent mechanical strength and durability, thus, the present invention has been completed.

That is to say, an object of the present invention is a resin gear for an electric power steering apparatus, in which a gear portion is formed of a resin molding material containing a thermosetting resin and polyparaphenylene -benzobisoxazole fibers as essential constituents.

In one preferred embodiment of the resin gear for an electric power steering apparatus according to the present invention, the above-mentioned thermosetting resin is a phenol resin, and more preferably a phenol resin having a weight average molecular weight of 3000 or more.

Further, in another preferred embodiment of the resin gear for an electric power steering apparatus of the present invention, the above-mentioned resin molding material further includes reinforcing fibers.

It is another object of the present invention to provide 1) an electric power steering apparatus which transmits rotation of an electric actuator for generating steering assist force to a wheel through a worm and a worm wheel engaging the worm, wherein the above described resin gear for an electric power steering apparatus is employed as the worm wheel, 2) an electric power steering apparatus which transmits rotation of an electric actuator for generating steering assist force to a wheel through a drive gear and a driven gear engaging the drive gear, wherein the above described resin gear for an electric power steering apparatus is employed as the drive gear and/or the driven gear, and 3) an electric power steering apparatus which transmits rotation of an electric actuator for generating steering assist force to a wheel through a drive gear, an intermediate gear engaging the drive gear and a driven gear engaging the intermediate gear, wherein the above described resin gear for an electric power steering apparatus is employed as at least any one of the drive gear, the intermediate gear and the driven gear.

In the resin gear for an electric power steering apparatus according to the present invention, the gear portion thereof is formed of a resin molding material containing, as essential constituents, a thermosetting resin and polyparaphenylene-benzobisoxazole fibers (hereinafter also referred to as PBO fibers) as reinforcing fibers, whereby the thermosetting resin and the PBO fibers are combined to exhibit the excellent mechanical strength and durability.

Further, the PBO fibers which is contained in the resin material constituting the gear portion of the resin gear has a low attacking property to its counter member. Accordingly, for example, even when a worm wheel as the resin gear of the present invention is used in combination with a metal worm in an electric power steering apparatus, abrasion of such a metal worm can be effectively inhibited, whereby a lifetime of the whole electric power steering apparatus can be improved advantageously.

Such excellent effects can be obtained advantageously by using a phenol resin as the thermosetting resin, especially a phenol resin having a weight average molecular weight of 3000 or more, or by using, as the above-mentioned resin molding material, one further containing reinforcing fibers of another kind together with the PBO fibers.

Accrodingly, the resin gear according to the present invention can exhibit excellent characteristics as described above, so that it can be advantageously employed also in an electric power steering apparatus equipped with a high-power electric actuator, in which a conventional resin gear has been difficult to be employed.

DESCRIPTION OF REFERENCE NUMERALS

Figure 1:
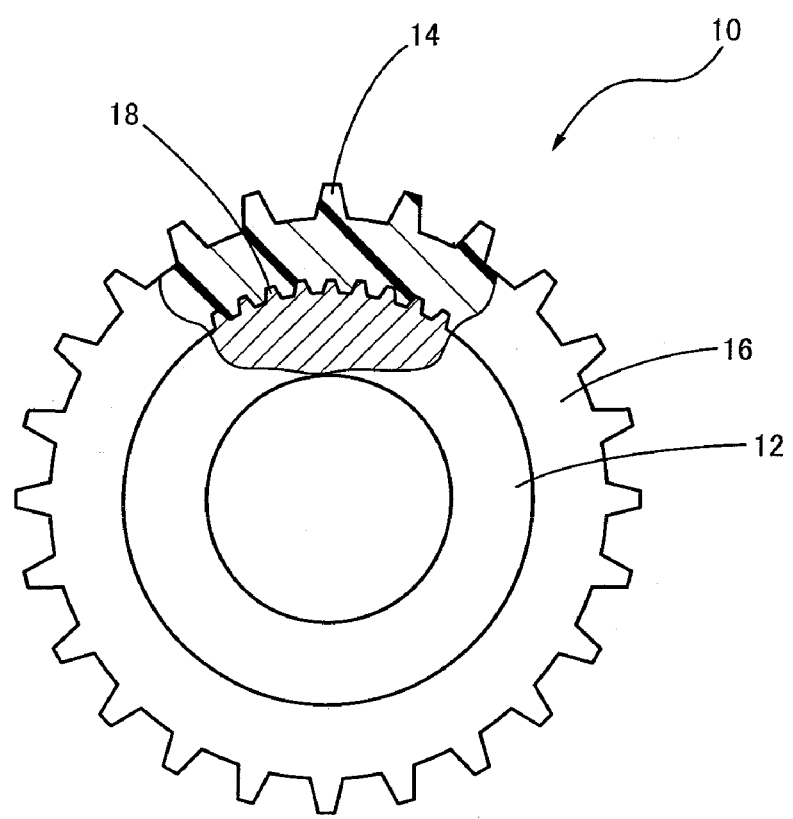
FIG. 1 is a partially cutaway cross-sectional view showing one example of a worm wheel as a resin gear for an electric power steering apparatus according to the present invention.

| 10 | Worm Wheel | 12 | Metal Sleeve |
|----|------------|----|--------------|
| 14 | Teeth | 16 | Gear Portion |
| 18 | Ridges | 20 | Electric Power Steering System |
| 22 | Motor | 24 | Steering Wheel |
| 26 | Steering Shaft | 28 | Pinion |
| 30 | Rack | 32 | Wheel |
| 34 | Pin | 36 | Bush |
| 38 | Torsion Bar | 40 | Pin |
| 42 | Housing | 44 | Steering Column |
| 46 | Bush | 52 | Locking Projection |
| 54 | Torque Sensor | 56 | First Detecting Ring |
| 58 | Second Detecting Ring | 60 | Detecting Coil |
| 62 | Driving Shaft | 64 | Worm |

DETAILED DESCRIPTION OF THE INVENTION

The resin gear for an electric power steering apparatus according to the present invention has a gear portion which is formed by using a specified resin molding material and is on an outer peripheral surface of a hub portion comprising a metal member (generally having a cylindrical body). When the resin gear of the present invention having such a structure is produced, the specified resin molding material, namely, a resin molding material containing a thermosetting resin and polyparaphenylene-benzobisoxazole fibers (PBO fibers) as essential constituents, is first prepared. As the thermosetting resin used in the present invention, any one can be used as long as it has conventionally been used in producing a resin gear for an electric power steering apparatus. Specific examples thereof include a phenol resin, an epoxy resin, an unsaturated polyester resin, a diallyl phthalate resin, a cross-linked polyesteramide resin, a polyimide resin, a melamine resin, a urea resin, an urethane resin and the like. From these, ones depending on characteristics required for the resin gear to be obtained is appropriately selected, and used either alone or as a combination of two or more thereof. Of these thermosetting resins, the phenol resin is advantageously used in the present invention.

The phenol resin used in the present invention may be any type of phenol resins such as a resol type phenol resin, a phenolic novolak resin and the like. However, a phenol resin having a weight average molecular weight of 3000 or more is advantageously used, and more advantageously, a phenol resin having a weight average molecular weight of 4000 or more is used. Of these, the resol type phenol resin and a modified phenolic novolak resin containing a curing agent in the resin is favorable, for example. The employment of the phenol resin having such a specified weight average molecular weight reduces the amount of gas which is generated at the time of curing thereof, so that the occurrence of minute gas defects in the resin gear as a molded article is effectively inhibited. As a result, there is advantageously obtained the resin gear for an electric power steering apparatus excellent in durability and mechanical strength. The weight average molecular weight of the phenol resin can be calculated, for example, in terms of polystyrene measured by gel permeation chromatography (GPC).

In addition, as the phenol resin having a weight average molecular weight of 4000 or more, conventionally known various ones can be used. Of these, in the present invention, there is advantageously used a phenol resin (mixture) which is obtained by mixing a resol type phenol resin (phenol resin (A)) having a weight average molecular weight of 4000 or less and a phenol resin (phenol resin (B)) having a weight average molecular weight of 5000 or more and having a solubility in boiling methanol of 70% or more, at a predetermined rate, and which is adjusted in the weight average molecular weight of the whole thereof to 4000 or more. When such a phenol resin (mixture) is used, fluidity of the resin molding material at the time of molding is sufficiently secured, and the resin gear for an electric power steering apparatus which exhibits uniform mechanical strength on the whole, for example, can be produced. The solubility in boiling methanol may be substituted for solubility in tetrahydrofuran at 50° C.

Specifically, as the phenol resin (A), it is preferable to use a dimethylene ether type (benzylic ether type) resol resin which is solid and easy to handle. Further, examples of phenol resin (B) include, for instance, Bellpearl (brand name, manufactured by Air Water Bellpearl Inc.) produced by bringing a phenol into contact with a hydrochloric acid-formaldehyde bath containing hydrochloric acid and excess formaldehyde, in a state where the temperature in a reaction system is kept at lower than a predetermined temperature, as disclosed in JP-B-62-30210 and JP-B-62-30211, and Univex (brand name, manufactured by Unitika Ltd.) which is a modified novolak resin formed by a suspension polymerization method and containing a curing agent dispersed in the resin. In the present invention, Bellpearl (brand name) is particularly advantageously used.

When phenol resin (A) and phenol resin (B) described above are used in combination as the thermosetting resin in producing the resin gear for an electric power steering apparatus of the present invention, the compounding ratio thereof is appropriately determined depending on the kind of phenol resin (A) or the like to be used. The compounding ratio is generally determined such that the mass ratio of phenol resin (A) and phenol resin (B) [phenol resin (A)/phenol resin (B)] becomes within the range of 5/95 to 95/5, preferably within the range of 25/75 to 75/25, and more preferably within the range of 35/65 to 60/40. The use of the phenol resin (mixture) compounded at such a ratio results in exhibiting excellent mechanical strength and durability in the resulting resin gear, and further exhibiting uniform mechanical characteristics as a whole.

In addition, when the resin gear of the present invention is produced, as the thermosetting resin, there is advantageously used one which is solid at room temperature, from the viewpoints of workability and the like. Specifically, there is used a thermosetting resin as described above which is granular and has an average particle size of about 1 to 100 μm, preferably about 1 to 50 μm.

On the other hand, in the resin molding material which is used at the time of producing the resin gear for an electric power steering apparatus according to the present invention, the polyparaphenylene-benzobisoxazole fibers (PBO fibers) used as the essential constituent together with the thermosetting resin as described above is not particularly limited. However, considering dispersibility of the fibers in the resin molding material and workability in a molding process and the like, it is preferable to use monofilament-like ones having a fiber length of about 1 to 10 mm. Specifically, Zylon (brand name) available from Toyobo Co., Ltd. is advantageously used.

The compounding ratio of such polyparaphenylene-benzobisoxazole fibers (PBO fibers) in the resin molding material is determined such that the mass ratio of the PBO fibers and the thermosetting resin (PBO fibers/thermosetting resin) becomes 70/30 to 30/70, and preferably 60/40 to 40/60. By employing such a compounding ratio, the desired resin gear exhibiting excellent mechanical strength and durability is advantageously obtained.

In particular, when the resin molding material is prepared according to a wet papermaking process (wet sheet making process) described below, in producing the resin gear for an electric power steering apparatus according to the present invention, PBO fibers having an absolute value of a zeta potential of 10 mV or more, preferably 20 mV or more and more preferably 25 mV or more, in a state being dispersed in water, is advantageously used as the polyparaphenylene-benzobisoxazole fibers (PBO fibers). The PBO fibers are effectively dispersed in a resin molding material in the form of slurry, and the slurry is subjected to dehydration, drying and the like, whereby there is obtained a resin molding material (solid) with the PBO fibers uniformly dispersed. Accordingly, in the resin gear formed of such a resin molding material, uniform mechanical characteristics are exhibited in a gear portion thereof.

In the present invention, for the purpose of improving various characteristics in the resin gear for an electric power steering apparatus, it is also possible to incorporate various reinforcing fibers which have been conventionally used in the thermosetting resin and polyparaphenylene-benzobisoxazole fibers described above. The example of reinforcing fibers include aramid fibers (including aramid pulp), ultra-high-strength polyethylene fibers, carbon fibers, boron fibers, alumina fibers, glass fibers (including surface-treated ones with a silane coupling agent or the like), silicon carbide fibers, fully aromatic polyester fibers and the like. One or two or more of these are appropriately selected to use. Of these, in consideration of such as durability, mechanical characteristics, impact resistance of the resin gear and attacking property to a metal member as a counter member (for example, a metal gear, a metal worm or the like), organic fibers are preferable, and particularly, the aramid fibers (including aramid pulp) are advantageously used.

The reinforcing fibers are incorporated in the resin molding material such that mass ratio with the above-mentioned polyparaphenylene-benzobisoxazole fibers (polyparaphenylene-benzobisoxazole fibers/reinforcing fibers) becomes 100/0 to 10/90, preferably 95/5 to 20/80, and more preferably 95/5 to 40/60. Incorporation at the above compounding ratio makes it possible to advantageously enjoy the advantage of adding the reinforcing fibers.

Further, when the resin gear according to the present invention is produced, a release agent such as a stearate, and the like, may be incorporated in the resin molding material, as long as it does not go against the objects and advantages of the present invention.

Then, when the resin gear for an electric power steering apparatus of the present invention is produced, the resin molding material is first prepared by using the thermosetting resin and polyparaphenylene-benzobisoxazole fibers (PBO fibers) described above, and further by using the reinforcing fibers and the like as needed. The resin gear of the present invention can be produced by any of conventionally known techniques. In particular, however, in view of the fact that the resin molding material with the PBO fibers uniformly dispersed can be obtained, there can be advantageously employed a technique of dispersing the respective components described above in a predetermined solvent to form a slurry, and then, dehydrating and drying the slurry to obtain the resin molding material. Specifically, it is preferred that the resin molding material is prepared according to the wet papermaking process using water as the solvent.

According to the wet papermaking process, the thermosetting resin and polyparaphenylene-benzobisoxazole fibers, and the other reinforcing fibers as needed, are first put in a disintegrator or beater (for example, a pulper, a refiner, a Henschel mixer or the like) in which a large amount of water has been placed, and subjected to high-speed stirring mixing, thereby slurrying the mixture. Then, the resulting mixture slurry is transferred into a mixing tank equipped with a stirring blade, and a particle collecting agent is added, followed by low-speed stirring mixing to form a slurry for sheet making having a thermosetting resin concentration of about 0.01 to 10%. Then, this slurry for sheet making is poured into a sheet-like or cylindrical mold having a desired size, dehydrated by application of filtration, pressure reduction, compression and the like, and further dried with a dryer (for example, a drum dryer, a dielectric heating dryer, a far-infrared ray dryer, a hot air ventilation dryer or the like), thereby obtaining the sheet-like or cylindrical resin molding material. The particle collecting agent used herein is not particularly limited, and a particle collecting agent (also referred to as a flocculating agent) generally used in paper making processes or water treatment may be employed.

While the resin molding material is prepared as above, the metal member generally having a cylindrical shape as the hub portion of the resin gear and a predetermined forming die (metal mold) are prepared. The metal member is disposed on a predetermined position in the forming die, and the entirety thereof is heated. A periphery of the metal member disposed in the forming die is filled with the resin molding material separately prepared. Specifically, the sheet-like resin molding material is wound in a cylindrical shape and inserted into the forming die, and the cylindrical resin molding material is inserted into the forming die as it is. After such an operation, molding is performed according to a technique such as compression molding at a temperature at which the thermosetting resin in the resin molding material is cured in any period of time, thereby forming a resin layer constituted by a cured article of the thermosetting resin containing the polyparaphenylene-benzobisoxazole fibers, on a surface of the metal member, with a predetermined thickness. Thus, an intermediate molded article of the resin gear is obtained. In addition, as conditions of performing the compression molding, there are employed a heating temperature of about 110 to 300° C. and a molding pressure of about 30 to 1000 kgf/cm$^2$.

Then, conventionally known process for forming gear tooth is performed to the resin layer in the resulting intermediate molded article to form the gear portion, thereby obtaining the resin gear for an electric power steering apparatus according to the present invention.

There will be described the resin gear for an electric power steering apparatus and the electric power steering apparatus equipped with the same according to the present invention with reference to drawings.

First, FIG. 1 is an illustrative view showing an example of a worm wheel as the resin gear for an electric power steering apparatus according to the present invention, in a state where a part thereof is cut away. A worm wheel 10 shown therein is produced by using a cylindrical resin molding material produced according to the wet papermaking process described above and a metal sleeve 12 forming a hub portion in the resulting worm wheel, as follows. On an outer peripheral surface of the metal sleeve 12, a layer (resin layer) having a predetermined thickness and comprising a cured article of the resin molding material is formed by compression molding, whereby an intermediate molded article is prepared. Then, a predetermined process for forming gear teeth is performed on the resin layer of the intermediate molded article. In a structure thereof, as also apparent from FIG. 1, a resin gear portion 16 having a plurality of teeth 14 is integrally provided on a periphery of the metal sleeve 12 as the hub portion.

On the outer peripheral surface of the metal sleeve 12 used therein, there are previously provided lattice-like ridges 18 by knurling in order to prevent relative rotation of the gear portion 16 and the metal sleeve 12 and in order to prevent the metal sleeve 12 from falling off in a thrust direction. When the height of the ridges 18 is too low or the pitch thereof is too small, there is a possibility of failing to obtain sufficient rotational torque and drop-out load in a thrust direction. On the other hand, when the height of the ridges 18 is too high, it is difficult to fill the gap between the ridges 18 adjacent to each other with the polyparaphenylene-benzobisoxazole fibers as the reinforcing fibers. Therefore, there is possibility of a decrease in strength of the gear portion 16 in the vicinity of the ridges 18. Accordingly, as for the ridges 18 provided on the outer peripheral surface of the metal sleeve 12, the height and pitch thereof are determined depending on steering assist force and the like of the electric power steering apparatus to be installed, and a knurling tool capable of providing such ridges 18 is used. As an example of such a knurling tool, there can be given one having a height of about 0.7 mm and a pitch of 2 mm.

Figure 2:
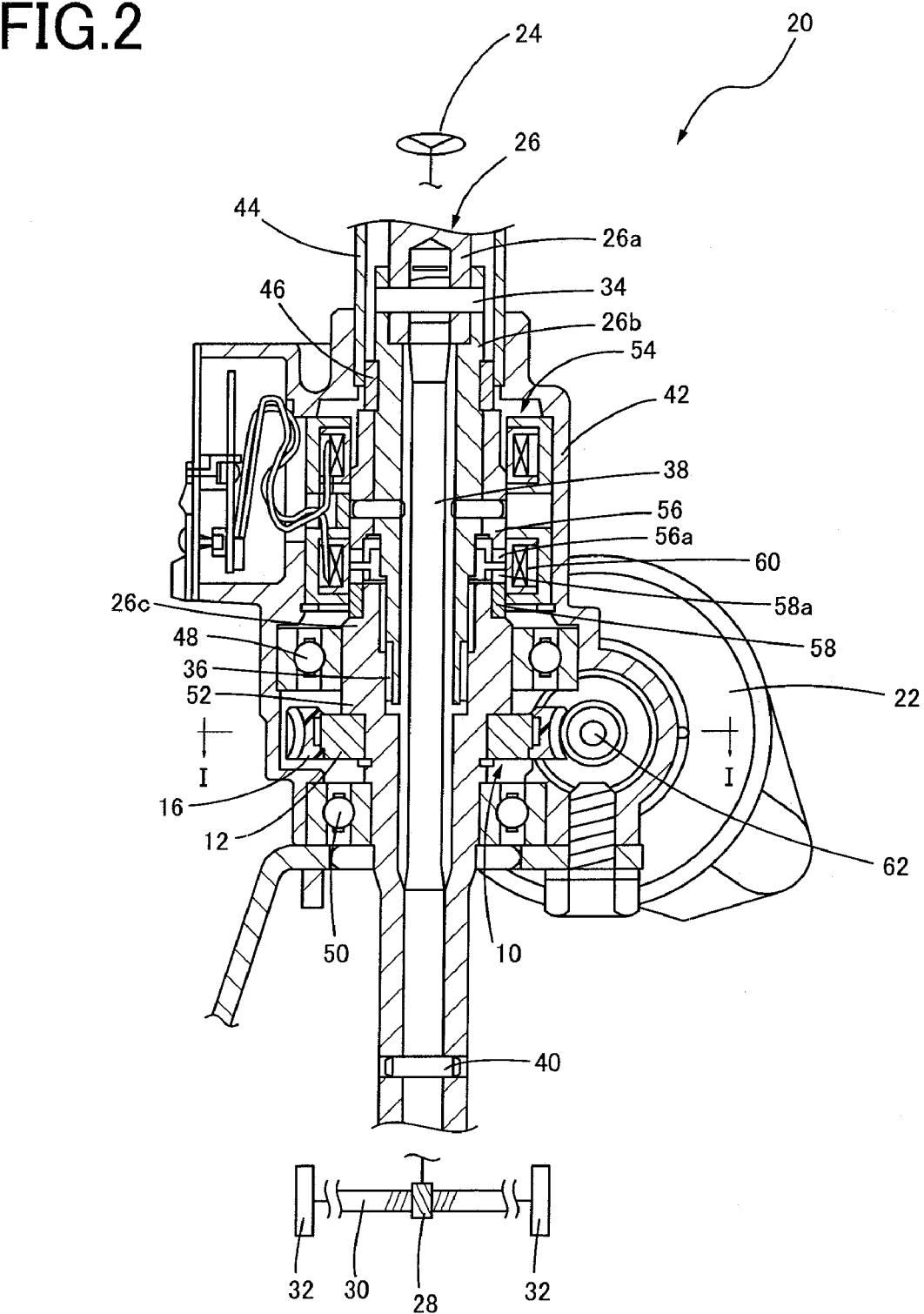
FIG. 2 is a front cross-sectional illustrative view showing one example of an electric power steering apparatus equipped with the worm wheel shown in FIG. 1.
Figure 3:
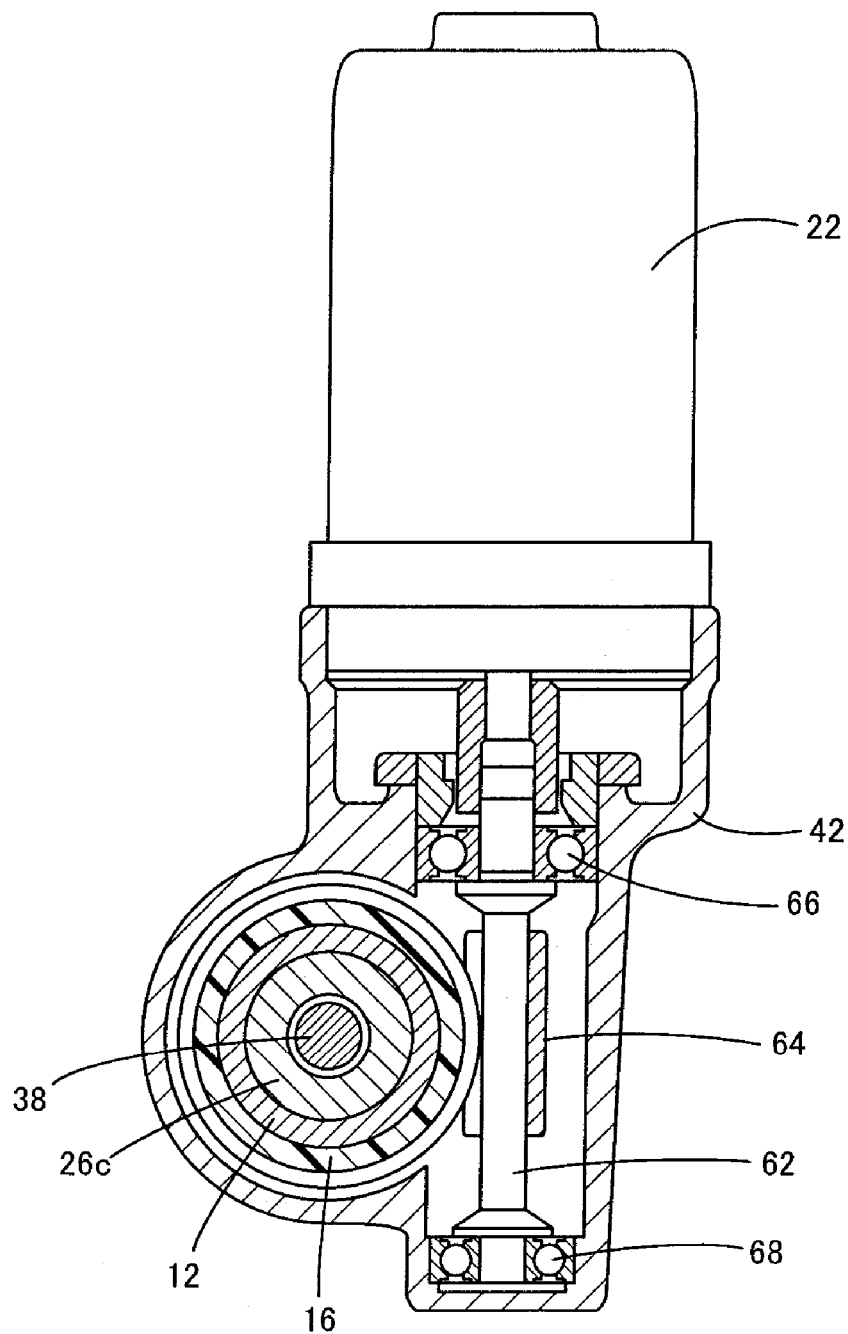
FIG. 3 is a cross-sectional illustrative view taken along line I-I in FIG. 2.

Further, FIG. 2 is a cross-sectional view schematically showing a constitution of an electric power steering apparatus equipped with the worm wheel 10 shown in FIG. 1. In addition, FIG. 3 is a cross-sectional view taken along line I-I in FIG. 2 and shows a speed reduction mechanism in the electric power steering apparatus and a constitution of a motor portion. The electric power steering apparatus 20 shown therein exhibits a function similar to that of a general steering device in case that steering assist force cannot be obtained from a motor 22 for some reason. Specifically, steering torque generated by steering of a steering wheel 24 is transmitted to a pinion 28 through a steering shaft 26, and the pinion 28 moves a rack 30 engaging with it in a leftward and rightward directions. Such leftward and rightward movement of the rack 30 is transmitted to wheels 32 through a tie rod, a knuckle arm and the like (not shown), thereby resulting in a change of rudder angle.

The working of the electric power steering apparatus 20 shown in FIG. 2 and FIG. 3 will be illustrated by observing the constitution of the electric power steering apparatus 20 in detail. The steering shaft 26 is composed of a first shaft 26a connected to the steering wheel 24, a second cylindrical shaft 26b connected to the first shaft 26a by a pin 34 and a third cylindrical shaft 26c relatively rotatably fitted to an outer periphery of the second shaft 26b through a bush 36. Further, a torsion bar 38 as an elastic member elongated vertically is inserted in the insides of those respective shafts 26a, 26b and 26c. An upper end of the torsion bar 38 is connected to the first shaft 26a and the second shaft 26b by the pin 34, and a lower end thereof is connected to the third shaft 26c by a pin 40. This makes it possible to elastically relatively rotate the second shaft 26b and the third shaft 26c depending on steering torque.

Further, the second shaft 26b is supported in a vicinity of an upper end thereof by a steering column 44 press-fitted into a housing 42 through a bush 46, and furthermore, the third shaft 26c is supported by the housing 42 through bearings 48 and 50.

Then, the third shaft 26c is press-fitted into the metal sleeve 12 of the worm wheel 10, such that a lower surface of a locking projection 52 provided at a somewhat upper side from the center thereof comes into contact with an upper surface of the metal sleeve 12 constituting the worm wheel 10, whereby the third shaft 26c and the worm wheel 10 can rotate integrally. In addition, such fixing may be performed through a key or the like. Further, a conventionally known torque limiter mechanism may be located between the metal sleeve 12 and the third shaft 26c, such that the third shaft 26c and the worm wheel 10 are advantageously relatively driven for rotation, even when excess torque is exerted.

Furthermore, in order to provide steering assist force depending on steering torque transmitted by the steering shaft 26, there is mounted a torque sensor 54 which detects steering torque. The torque sensor 54 is composed of a first detecting ring 56 which is made of a magnetic material and fixed to the second shaft 26b, a second detecting ring 58 which is made of a magnetic material and fixed to the third shaft 26c, and a detecting coil 60 which is arranged so as to cover the detecting rings 56 and 58 partially from the outside.

Further, the motor 22 which is driven depending on steering torque detected by the torque sensor 54 is mounted on the housing 42 at a position where a metal worm 64 disposed on an outer peripheral surface of a driving shaft 62 thereof and the worm wheel 10 fixed to the third shaft 26c are engaged with each other. In addition, the driving shaft 62 is supported by the housing 42 through bearings 66 and 68.

Then, in the electric power steering apparatus 20 having the above structure, steering torque is generated when a driver steers the steering wheel 24, and elastic relative rotation occurs between the second shaft 26b and the third shaft 26c depending on the steering torque, thereby changing the facing area of a plurality of teeth 56a provided so as to project downward from a bottom surface of the first detecting ring 56 and a plurality of teeth 58a provided so as to project upward from a top surface of the second detecting ring 58. Corresponding to the change in the facing area, the magnetoresistance of the detecting coil 60 to a generated magnetic flux changes, therefore steering torque is detected based on the output of the detecting coil 60, and the motor 22 is driven by a signal corresponding to the detected steering torque to rotate the driving shaft 62. Then, the driving of the motor 22 (rotation of the driving shaft 62) is decelerated through the worm 64 and the worm wheel 10, and transmitted to the steering shaft 26 as steering assist force, resulting in an advantageous reduction in the driver's labor for steering.

In the worm wheel 10 which is mounted on the electric power steering apparatus 20, the gear portion 16 thereof is formed of the resin molding material containing the thermosetting resin and the polyparaphenylene-benzobisoxazole fibers as essential constituents, and exhibits excellent durability and mechanical strength compared to a worm wheel having a conventional resin gear portion. Accordingly, even when the steering assist force is high power, the worm wheel 10 is allowed to make it possible to effectively transmit the steering assist force to the steering shaft 26 without chipping the teeth 14 of the gear portion 16.

Accordingly, such an electric power steering apparatus which can resist high-power steering assist force can be advantageously employed also in a large car which has conventionally been considered to have difficulty to mount an electric power steering apparatus thereon.

Further, the gear portion of the worm wheel (resin gear) according to the present invention is formed of the resin layer containing the polyparaphenylene-benzobisoxazole fibers (PBO fibers), and the PBO fibers are low in attacking property to its counter member. Accordingly, even when such a worm wheel (resin gear) is used in combination with the metal worm (metal member such as the metal gear) in the electric power steering apparatus, abrasion of the metal worm can be effectively inhibited, and thus an improvement of lifetime of the whole electric power steering apparatus can be obtained advantageouly.

Although one example of the electric power steering apparatus using the resin gear for an electric power steering apparatus according to the present invention has been described above, it goes without saying that the resin gear of the present invention can also be employed in an electric power steering apparatus having a structure other than one described above.

That is to say, the electric power steering apparatus 20 disclosed in FIG. 1 and FIG. 2 has a mechanism in which driving of the motor 22 (rotation of the driving shaft 62) is decelerated through the worm 64 as a drive gear and the worm wheel 10 as a driven gear, and transmitted as steering assist force to the steering shaft 26. However, the resin gear of the present invention can also be advantageously used in an electric power steering apparatus having a mechanism in which driving (rotation) of a motor (electric actuator for generating steering assist force) is decelerated by a combination of predetermined gears, and transmitted as steering assist force to a rack shaft (steering shaft) connected to wheels, as disclosed in FIG. 4 in JP-A-2002-156025, and in JP-A-2004-114972, US2007/10229 A1 and the like.

The type of gear for decelerating driving (rotation) of the motor (electric actuator for generating steering assist force) in the various electric power steering apparatuss is appropriately selected from conventionally known gears, depending on the relative positional relationship between a driving shaft of the motor (or another member coaxially connected to the driving shaft) and a steering shaft or a rack shaft (or a member disposed coaxially with any of these members).

For example, there is disclosed, in US2007/10229 A1, an electric power steering apparatus in which a gear shaft 40 splined at one end thereof to a motor shaft 3a of a steering motor 3 and a rack shaft (steering shaft) 1 are arranged in such positional relationship that respective axis lines are crossed (see FIG. 2 in the aforementioned publication). Bevel gears (a small bevel gear 4 and a large bevel gear 6) are employed therein as a drive gear and a driven gear, however it is possible to employ the resin gear of the present invention as both or any one of these bevel gears. In addition, in an electric power steering apparatus having a structure disclosed in the aforementioned publication, it is also possible to use a hypoid gear as the drive gear and the driven gear in place of the bevel gear.

Further, in electric power steering apparatuses in which the driving shaft of the motor (or another member coaxially connected to the driving shaft) and the steering shaft or the rack shaft (or a member coaxially connected to any of these members) are arranged in parallel, there is one type having a structure in which driving (rotation) of the motor is decelerated through a drive gear, an intermediate gear (idler gear) and a driven gear. In such an electric power steering apparatus, the resin gear of the present invention is employed as at least one of the drive gear, the intermediate gear (idler gear) and the driven gear, particularly advantageously as the intermediate gear (idler gear), thereby being able to advantageously enjoy the advantages of the present invention. As the drive gear and the driven gear in the electric power steering apparatus having such a structure, there is employed a spur gear, a helical gear or the like.

EXAMPLES

To further clarify the present invention, there will be described some examples of the present invention. It is to be understood that the present invention is not limited to the details of the following examples. It is also to be understood that the present invention may be embodied with various other changes and modifications which may occur to those skilled in the art, in addition to the following examples and the above-mentioned detailed descriptions, without departing from the spirit and scope of the present invention. The weight average molecular weight (Mw) of a phenol resin used in the present examples and the performances of the obtained worm wheel for an electric power steering apparatus were evaluated according to methods shown below.

<Weight Average Molecular Weight (Mw)>

The weight average molecular weight (Mw) in terms of standard polystyrene was determined by GPC measurement using a gel filtration chromatograph, SC-8020 series built-up system (column: G2000H$_{XL}$+G4000H$_{XL}$, detector: UV 254 nm, carrier: tetrahydrofuran 1 mL/min, column temperature: 38° C.), available from TOSOH CORPORATION.

<Measurement of Bending Strength and Tensile Strength>

Test pieces were prepared by using each resin molding material prepared in sheet form, and the bending strength and tensile strength of the test pieces were measured based on JIS-K-6911.

<Evaluation of Durability>

A produced worm wheel was mounted in the speed reduction mechanism (gear assembly) shown in FIG. 2, and the steering wheel 24 was subjected to reciprocating turns at a constant rotation angle in a state where a constant load was allowed to act thereon from the third shaft 26c which is on the wheel side. The number of reciprocating rotations was measured when a tooth of the worm wheel was damaged. In Examples 1 to 5 and Comparative Example 2, the number of reciprocating rotations of the worm wheel in Comparative Example 1 is taken as 1, and the durability was evaluated as a ratio to a value of Comparative Example 1. In Example 6, the durability was evaluated as a ratio to a value of Comparative Example 3.

Example 1

Polyparaphenylene-benzobisoxazole fibers (Zylon fibers, manufactured by Toyobo Co., Ltd., fiber length: 3.0 mm) and a phenol resin having a weight average molecular weight of 4000 or more (manufactured by Asahi Organic Chemicals Industry Co., Ltd., weight average molecular weight: 5200, average particle size: 20 μm) were placed in a Henschel mixer at a ratio of 50/50 (mass ratio), and further, an appropriate amount of water was added, followed by high-speed stirring mixing, whereby there is obtained a mixture in the form of slurry in which the concentration of a mixture of fibers and resin was adjusted to 1% by mass.

Then, the resulting slurry-like mixture was filtered and pressure dehydrated by a standard square sheet machine (manufactured by Toyo Seiki Seisaku-Sho Ltd.) to obtain a sheet-like wet resin molding material (sheet making material). The wet resin molding material was dried in a hot air circulating dryer of 50° C., thereby producing a sheet-like resin molding material. Then, the resulting sheet-like resin molding material was filled in a metal mold heated to 180° C., and press molding was performed, thereby obtaining a molded article. From that molded article, respective test pieces for measurement of the bending strength and tensile strength were prepared, and the bending strength and tensile strength were measured. The results thereof are shown in Table 1.

On the other hand, by using the above-mentioned PBO fibers and phenol resin, a slurry-like mixture was prepared according to the same technique described above. The mixture was put in a cylindrical forming die whose bottom surface was formed of meshes. Then, the mixture was filtered and pressure dehydrated to obtain a cylindrical wet resin molding material. The cylindrical wet resin molding material was dried in a hot air circulating dryer of 50° C., thereby producing a cylindrical resin molding material.

Then, after a metal sleeve was disposed in a metal mold heated to 180° C., the resulting cylindrical resin molding material was inserted into the metal mold to fill the periphery of the metal sleeve with the resin molding material. In such a state, press molding was performed, thereby producing an intermediate molded article of a worm wheel. Further, machining was conducted to the resulting intermediate molded article, thereby producing a worm wheel having a shape as shown in FIG. 1. For the resulting worm wheel, durability thereof was evaluated. The results thereof are shown in Table 1.

Examples 2 to 6

Test pieces for measurement of the bending strength, test pieces for measurement of the tensile strength and worm wheels were produced according to the same technique as in Example 1 with the exception that the components constituting the resin molding material and the compounding ratio thereof were changed as shown in the following Tables 1 and 2. Those are each evaluated in the same manner as in Example 1. In Example 6, a diallyl phthalate resin (manufactured by DAISO CO., LTD., brand name: Isodap, average particle size: 20 μm) to which 1.0% of dicumyl peroxide was externally added was used as the thermosetting resin. Further, as the reinforcing fibers, there were used aramid pulp (manufactured by Du Pont Kabushiki Kaisha) in Examples 2 to 6, m-aramid fibers (manufactured by Teijin Limited, fiber length: 3.0 mm) in Example 3, and p-aramid fibers (manufactured by Teijin Limited, fiber length: 3.0 mm) in Examples 4 to 6, respectively. The results of measurement and evaluation are shown in the following Tables 1 and 2.

Comparative Examples 1 to 3

Test pieces for measurement of the bending strength, test pieces for measurement of the tensile strength and worm wheels were produced according to the same technique as in Example 1 with the exception that the components constituting the resin molding material and the compounding ratio thereof were changed as shown in the following Tables 1 and 2. Those are each evaluated in the same manner as in Example 1. The results thereof are shown in the following Tables 1 and 2.

TABLE 1

| | | Example 1 | Example 2 | Example 3 | Example 4 | Example 5 | Comparative Example 1 | Comparative Example 2 |
|---|---|---|---|---|---|---|---|---|
| Compounding Ratio (parts by mass) | PBO Fibers | 50 | 40 | 30 | 20 | 29 | — | — |
| | p-Aramid Fibers | — | — | — | 20 | 9 | 40 | 20 |
| | m-Aramid Fibers | — | — | 10 | — | — | — | 20 |
| | Aramid Pulp | — | 10 | 10 | 10 | 9 | 10 | 10 |
| | Phenol Resin | 50 | 50 | 50 | 50 | 55 | 50 | 50 |
| Bending Strength (MPa) | | 278 | 286 | 279 | 296 | 282 | 284 | 282 |
| Tensile Strength (MPa) | | 257 | 265 | 221 | 213 | 275 | 237 | 170 |
| Durable Lifetime Ratio | | 1.7 | 2 | 1.9 | 2.5 | 1.4 | 1 | 1.1 |

TABLE 2

| | | Example 6 | Comparative Example 3 |
|---|---|---|---|
| Compounding Ratio (parts by mass) | PBO Fibers | 20 | — |
| | p-Aramid Fibers | 20 | 20 |
| | m-Aramid Fibers | — | 20 |
| | Aramid Pulp | 10 | 10 |
| | Diallyl Phthalate Resin | 50 | 50 |
| Bending Strength (MPa) | | 252 | 247 |
| Tensile Strength (MPa) | | 162 | 111 |
| Durable Lifetime Ratio | | 1.5 | 1 |

As apparent from the results of Table 1, it was observed that the worm wheels (Examples 1 to 5) molded by using the resin molding materials in which the thermosetting resin (phenol resin) and the PBO fibers were blended as in the present invention had excellent durability, while having bending strength and tensile strength equivalent to or higher than those of Comparative Examples 1 and 2. Further, from the results of Table 2, even when the diallyl phthalate resin to which dicumyl peroxide was externally added was used as the thermosetting resin, there is obtained the similar results as in the case where the phenol resin was used.

What is claimed is:

1. A resin gear for an electric power steering apparatus including a gear portion comprising a resin molding material comprising a thermosetting resin and polyparaphenylenebenzobisoxazole fibers having a length of 1 to 10 mm.

2. The resin gear for an electric power steering apparatus according to claim 1, wherein said thermosetting resin is a phenol resin.

3. The resin gear for an electric power steering apparatus according to claim 2, wherein said phenol resin is a phenol resin having a weight average molecular weight of 3000 or more.

4. The resin gear for an electric power steering apparatus according to claim 1, wherein said resin molding material further comprises reinforcing fibers.

5. An electric power steering apparatus which transmits rotation of an electric actuator for generating steering assist force to a wheel through a worm and a worm wheel, comprising the resin gear for an electric power steering apparatus according to claim 1, engaging said worm.

6. An electric power steering apparatus which transmits rotation of an electric actuator for generating steering assist force to a wheel through a drive gear and a driven gear engaging said drive gear, wherein at least one of said drive gear and said driven gear comprises the resin gear for an electric power steering apparatus according to claim 1.

7. An electric power steering apparatus which transmits rotation of an electric actuator for generating steering assist force to a wheel through a drive gear, an intermediate gear engaging said drive gear and a driven gear engaging said intermediate gear, wherein at least any of said drive gear, said intermediate gear and said driven gear comprise the resin gear for an electric power steering apparatus according to claim 1.

* * * * *